(12) United States Patent
Wang

(10) Patent No.: US 8,461,868 B1
(45) Date of Patent: Jun. 11, 2013

(54) CHIP COMPRISING A SIGNAL TRANSMITTING CIRCUIT, COMMUNICATION SYSTEM BETWEEN MULTIPLE CHIPS AND ITS CONFIGURATION METHOD

(75) Inventor: Fei Wang, Guangzhou (CN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/523,798

(22) Filed: Jun. 14, 2012

(30) Foreign Application Priority Data

Feb. 22, 2012 (CN) .......................... 2012 1 0041881

(51) Int. Cl.
*H03K 19/003* (2006.01)
(52) U.S. Cl.
USPC .................................. 326/30; 326/21; 326/86
(58) Field of Classification Search
USPC ............ 326/21, 26–27, 30, 31, 33, 34, 82–87
See application file for complete search history.

(56) References Cited

U.S. PATENT DOCUMENTS

| | | | | |
|---|---|---|---|---|
| 5,781,028 A * | 7/1998 | Decuir | ............................. | 326/30 |
| 6,018,549 A * | 1/2000 | Reay et al. | ..................... | 375/257 |
| 6,906,549 B2 * | 6/2005 | Schoenborn et al. | ........... | 326/30 |
| 7,161,388 B2 * | 1/2007 | Schoenborn et al. | ........... | 326/86 |
| 7,427,872 B2 * | 9/2008 | Schoenborn et al. | ........... | 326/15 |
| 2005/0189961 A1 * | 9/2005 | Frans et al. | ..................... | 326/30 |

* cited by examiner

*Primary Examiner* — Jany Richardson
(74) *Attorney, Agent, or Firm* — Zilka-Kotab, PC

(57) ABSTRACT

A chip comprising a signal transmitting circuit, a communication system between multiple chips and a method for configuring the communication system between multiple chips are provided. The signal transmitting circuit of the chip comprises a multi-route selector, a first bias resistor and a second bias resistor, a first signal line and a second signal line, and a signal transmitting end; wherein the multi-route selector comprises a first input end, a second input end, a selection input end and an output end, wherein the first input end is grounded, the second input end is connected to a DC bias voltage and the selection input end receives a selection signal; wherein the multi-route selector selects the first input end when the selection signal is a first selection signal, and the multi-route selector selects the second input end when the selection signal is a second selection signal.

20 Claims, 6 Drawing Sheets

CHIP COMPRISING A SIGNAL TRANSMITTING CIRCUIT, COMMUNICATION SYSTEM BETWEEN MULTIPLE CHIPS AND ITS CONFIGURATION METHOD

CLAIM OF PRIORITY

The present application claims the priority of Chinese Patent Application No. 201210041881.2, filed Feb. 22, 2012, which is incorporated herein by reference.

FIELD OF INVENTION

The present invention relates generally to chip technology field and, in particular, to a chip comprising a signal transmitting circuit, a communication system between multiple chips and a method for configuring the communication system between multiple chips.

BACKGROUND

In the prior art, AC coupling capacitors are designed between multiple chips communicating with each other because that: according to PCIE (PCI-Express) standards, a DC bias voltage set at a transmitting end (named as Tx) is V_bias (less than 3.6V), while a DC bias voltage set at a receiving end (named as Rx) is 0V. The difference of the DC bias voltages set at Tx and Rx makes DC common mode voltages of the signals at Tx and Rx different. Further, the different DC common mode voltages of the signals at Tx and Rx mean that the AC coupling capacitors are necessary for blocking DC and delivering AC.

Inserting the AC coupling capacitors between the chips communicating with each other provides many benefits to the physical link design. For example, the compatibility between different systems can be implemented, such as allowing for different chip processes for Tx and Rx, allowing for different system architectures for Tx and Rx and so on, so that different processes/architecture/supply voltages/grounds can be selected by the designers for Tx and Rx in a flexible way. Also, a risk of over-voltage can be avoided. These above benefits are very useful for communication link design across different systems.

However, designing the AC coupling capacitors between the chips communicating with each other also brings many defects. In particular, these AC coupling capacitors take up considerable PCB area and bring cost adding; FIG. 1 shows a 16×PCIE link design example between NVIDIA PCIE bridge chip BR04 and GPU, wherein 64 pieces of AC coupling capacitors are required for 16 lanes between the two chips. In addition, pads and test points of the AC coupling capacitors cause impedance discontinuity which degrades the signal integrity on such high speed (5 Gbps) data exchange link.

In practical applications, designing the AC coupling capacitors between the chips communicating with each other is very useful for cross-platform PCIE link design, like motherboard and graphics card, to make the different voltages of their PCIE signals compatible and avoid the over-voltage. However, for the chips on the same platform (especially on the same PCB board), if they have similar processes/architecture, and can share the same PCIE power supply and the same ground, then they can have the same common mode voltages for PCIE signals. For this case, it does more harm than good to employ the AC coupling capacitors in accordance with the PCIE standards due to the many defects caused by such design.

Therefore, it is required to provide a technical solution to solve the above problems in the conventional communication system between multiple chips.

SUMMARY OF THE INVENTION

To solve these problems, the present invention provides a technical solution for improving the signal transmitting circuit in the chip to eliminate the design of the AC coupling capacitors for the communication between the chips on the same platform and hence the drawbacks it brings.

For the above purpose, in one aspect of this application, a chip comprising a signal transmitting circuit is provided and said signal transmitting circuit further comprises: a multi-route selector, comprising a first input end, a second input end, a selection input end and an output end, wherein said first input end of said multi-route selector is grounded, said second input end is connected to a DC bias voltage and said selection input end receives a selection signal; a first bias resistor and a second bias resistor, one end of each of said first bias resistor and second bias resistor being connected to said output end of said multi-route selector respectively; a first signal line and a second signal line, coupling to the other end of said first bias resistor and the other end of said second bias resistor respectively; a signal transmitting end, transmitting a pair of differential signals through said first signal line and said second signal line; wherein said multi-route selector selects said first input end when said selection signal is a first selection signal, and said multi-route selector selects said second input end when said selection signal is a second selection signal.

Preferably, said first selection signal is zero level and said second selection signal is non-zero level.

Preferably, said first selection signal is non-zero level and said second selection signal is zero level.

Preferably, said first selection signal and said second selection signal are set as other values.

Preferably, said signal transmitting circuit further comprises a selection signal generator for generating said selection signals.

Preferably, said selection signal generator can be implemented as a register.

Preferably, said selection signal generator can be implemented as a program fixed in BIOS of a chip where said signal transmitting circuit occurs.

Preferably, said selection signal generator can be implemented as a hardware circuit, including: a first selection resistor and a second selection resistor connected between a VCC terminal and a ground terminal in series; a selection signal output end, coupling between said first selection resistor and said second selection resistor; wherein said selection signal output end, said first selection resistor and said VCC terminal constitute a first path, and said selection signal output end, said second selection resistor and said ground terminal constitute a second path; wherein only one of said first path and said second path is set in on-state at the same time.

Preferably, said chip may be selected from the group consisting of a GPU chip, a bridge chip, a chipset with a PCIE interface and the like.

For the above purpose, in another aspect of this application, a communication system between multiple chips is provided and comprises: a first chip comprising a signal transmitting circuit, which is any of the above-mentioned chips comprising a signal transmitting circuit; a second chip, within said second chip a signal receiving circuit is set; wherein said first chip communicates with said second chip and said signal receiving circuit in said second chip receives said pair of differential signals transmitted by said first chip.

Preferably, said first chip and said second chip are set on the same platform, and said multi-route selector in said first chip selects said first input end.

Preferably, said same platform includes the same PCB board.

Preferably, there may be no AC coupling capacitor set between said first chip and said second chip.

Preferably, there may be AC coupling capacitors set between said first chip and said second chip.

Preferably, there may be AC coupling capacitors set between said first chip and said second chip, and said multi-route selector in said first chip selects said second input end.

Preferably, said first selection signal is zero level and said second selection signal is non-zero level.

Preferably, said first selection signal is non-zero level and said second selection signal is zero level.

Preferably, said first selection signal and said second selection signal are set as other values.

Preferably, said first chip and said second chip may be selected from the group consisting of GPU chips, bridge chips, chipsets with a PCIE interface and the like.

For the above purpose, in another aspect of this application, a method for configuring the communication system between multiple chips is provided and said communication system between multiple chips is any of the above-mentioned communication systems between multiple chips; said method comprises the following steps: when a first condition is satisfied, setting said selection signal in said first chip as a first selection signal; said multi-route selector in said first chip selecting said first input end upon said first selection signal; wherein said first condition is that said first chip and said second chip are set on the same platform.

Preferably, said same platform includes the same PCB board.

Preferably, said first condition also includes there may be no AC coupling capacitor set between said first chip and said second chip. Alternatively, said first condition also includes there may be AC coupling capacitors set between said first chip and said second chip.

Preferably, said method for configuring said communication system between multiple chips may also comprises the following steps: when a second condition is satisfied, setting said selection signal in said first chip as a second selection signal; said multi-route selector in said first chip selecting said second input end upon said second selection signal; wherein said second condition is that there are AC coupling capacitors set between said first chip and said second chip.

Preferably, said first condition has a higher priority than said second condition.

Preferably, said first selection signal is zero level and said second selection signal is non-zero level.

Preferably, said first selection signal is non-zero level and said second selection signal is zero level.

Preferably, said first selection signal and said second selection signal are set as other values.

By the technical solutions provided by the present invention, it can achieve to eliminate the AC coupling capacitors for the communication between the chips on the same platform (especially on the same PCB board) to save the area of the PCB board, reduce the cost and improve the signal integrity. Meanwhile, two options, 0V and V_bias, are provided, so the technical solution provided by this application can be compatible with the conventional communication system between multiple chips equipped with the AC coupling capacitors.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Example embodiments are described herein in the context of the chip comprising a signal transmitting circuit, the communication system between multiple chips and the method for configuring the communication system between multiple chips. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Reference will now be made in detail to the preferred embodiments of the present invention, examples of which are illustrated in the accompanying drawings.

The present invention discloses a chip comprising a signal transmitting circuit, which may be a GPU, a bridge chip, a chipset with a PCIE interface or the like.

Figure 1:
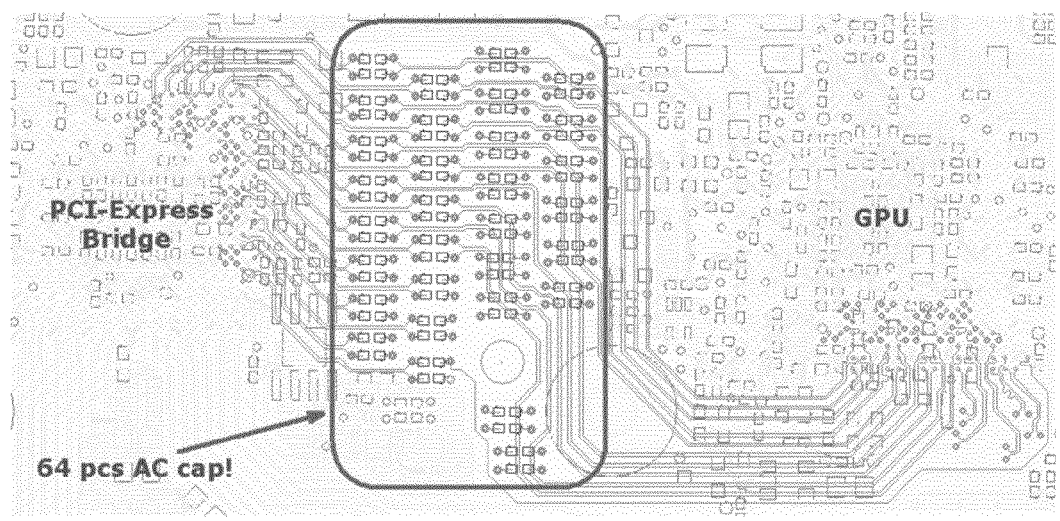
FIG. 1 illustrates a 16×PCIE link design example between NVIDIA PCIE bridge chip BR04 and GPU in the prior art.
Figure 2:
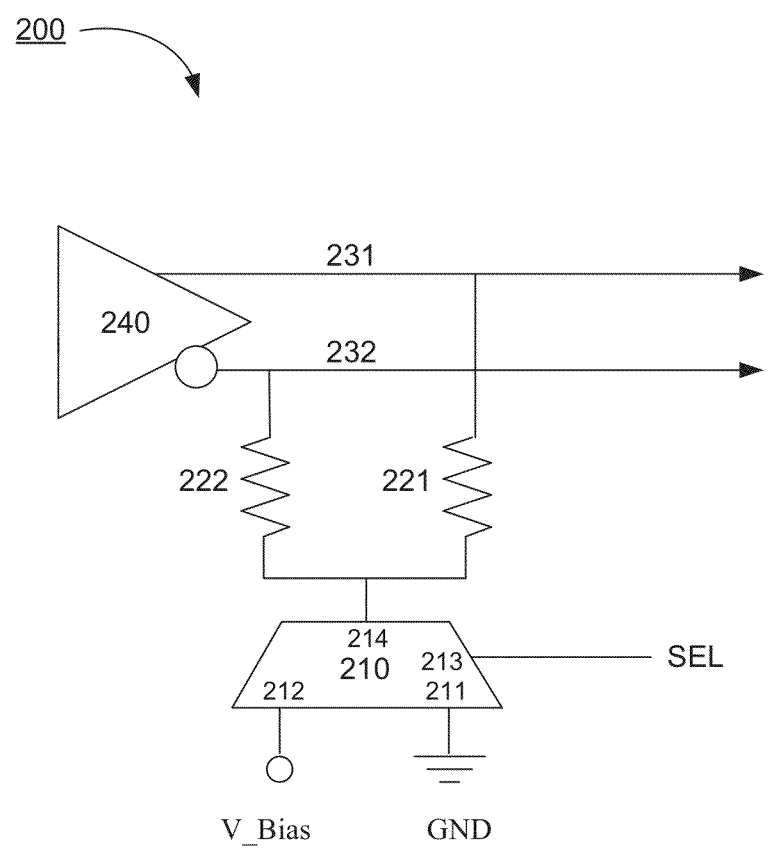
FIG. 2 illustrates a structure diagram of the signal transmitting circuit of the chip, in accordance with an exemplary embodiment of the present invention.

The chip provided by this application includes a signal transmitting circuit Tx, and FIG. 2 shows one of its embodiments. The signal transmitting circuit 200 shown by FIG. 2 comprises:

A multi-route selector 210, comprises a first input end 211, a second input end 212, a selection input end 213 and an output end 214; wherein the first input end 211 of the multi-route selector 210 is grounded, the second input end 212 is connected to a DC bias voltage V_bias and the selection input end 213 receives a selection signal SEL; the DC bias voltage V_bias can be determined based on the practical situation, for example, the bias used by the signal transmitting circuit of a typical NVIDIA GPU, which is not more than 3.6V according to the PCIE standards, may be 1.1V.

A first bias resistor 221 and a second bias resistor 222. One end of each of the first bias resistor 221 and the second bias resistor 222 is connected to the output end 214 of the multi-route selector 210 respectively; in a practical circuit, the first bias resistor 221 and a second bias resistor 222 with appropriate values can be chosen as required, such as 500.

A first signal line 231 and a second signal line 232, couple to the other end of the first bias resistor 221 and the other end of the second bias resistor 222 respectively.

A signal transmitting end 240, which transmits a pair of differential signals through the first signal line 231 and the second signal line 232.

In the above structure, the multi-route selector 210 selects the first input end 211 when the selection signal being a first selection signal, which means that the ground is selected; thus, 0V will be applied by the output end 214 to the first signal line 231 and the second signal line 232 via the first bias resister 221 and the second bias resistor 222, i.e. the DC bias voltage inputted into the signal transmitting end 240 is 0V, so that the operating DC common mode voltage of the differential signals on the first signal line 231 and the second signal line 232 is 0V.

And, the multi-route selector 210 selects the second input end 212 when the selection signal being a second selection signal, which means that the DC bias voltage V_bias is selected; thus, the DC bias voltage V_bias will be applied by the output end 214 to the first signal line 231 and the second signal line 232 via the first bias resister 221 and the second bias resistor 222, so that the operating DC common mode voltage of the differential signals on the first signal line 231 and the second signal line 232 is V_bias.

In the above embodiment, the first selection signal can be zero level and the second selection signal can be non-zero level; alternatively, the first selection signal can be non-zero level and the second selection signal can be zero level. Of course, other values can be specified for the first selection signal and the second selection signal by those skilled in the art based on practical need.

In an exemplary embodiment, the signal transmitting circuit 200 also comprises a selection signal generator (not shown in FIG. 2) for generating the selection signal. The selection signal generator can be implemented as being configured by a register, or as a program fixed BIOS of a chip where the signal transmitting circuit occurs, or as a hardware circuit.

Figure 3:
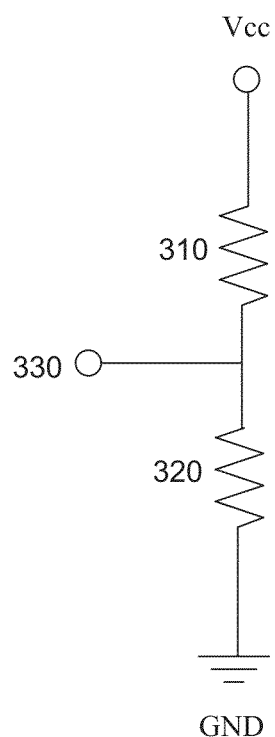
FIG. 3 illustrates a circuit diagram of the selection signal generator implemented through hardware, in accordance with an exemplary embodiment of the present invention.

FIG. 3 illustrates a circuit diagram of an embodiment in which the selection signal generator is implemented through a hardware circuit. In this embodiment, the hardware circuit 300 of the selection signal generator can switches its output between zero and non-zero. The hardware circuit 300 of the selection signal generator comprises:
a first selection resistor 310 and a second selection resistor 320 connected between a VCC terminal and a ground terminal in series;
a selection signal output end 330, coupling between the first selection resistor 310 and the second selection resistor 320 for supplying the selection signal for the selection input end of the multi-route selector; wherein the selection signal output end 330, the first selection resistor 310 and the VCC terminal constitute a first path, and the selection signal output end 330, the second selection resistor 320 and said ground terminal constitute a second path;
wherein only one of the first path and the second path is set in on-state at the same time; that is, at the same time, either the first path is conducted to make zero outputted by the selection signal output end 330, or the second path is conducted to make non-zero outputted by the selection signal output end 330.

The paths can be conducted in many ways. For example, control switches can be arranged on the first path and the second path respectively; or, when a certain path is needed to be conducted, the corresponding first or second selection resistor 310 or 320 can be stuffed into its own path.

Supposing that the path can be conducted via stuffing the resistors, if the first selection signal is determined as zero and the second selection signal is non-zero, the selection signal output end 330 will output zero to the multi-route selector when the first selection resistor 310 but not the second selection resistor 320 is stuffed, so that the operating DC common mode voltage of the differential signals outputted by the signal transmitting circuit is 0V; the selection signal output end 330 will output non-zero to the multi-route selector when the second selection resistor 320 but not the first selection resistor 310 is stuffed, so that the operating DC common mode voltage of the differential signals outputted by the signal transmitting circuit is V_bias. Of course, the reverse happens if the first selection signal is determined as non-zero and the second selection signal is zero and will not be described in detail here.

It can be found from the above embodiments that the chip comprising a signal transmitting circuit provided by this application can select the DC bias voltage for its signal transmitting circuit between V_bias and the ground, i.e. 0V. Therefore, in one aspect where the ground is selected, the operating DC common mode voltages of the signals of the signal transmitting circuit and the signal receiving circuit in a system meeting the PCIE standards can remain 0V, so that it is possible to eliminate the AC coupling capacitors between multiple chips and hence eliminate the defects caused by the AC coupling capacitor design. In the other aspect where V_bias is selected, the conventional products designed according to the PCIE standards can be compatible.

In particular, in one aspect, when 0V DC bias voltage is selected through the multi-route selector, no AC coupling capacitors for blocking DC and delivering AC are required on the communication path between this chip and other chips, so that the cost and the area of the PCB board can be saved and the degradation of the quality of the signals caused by adding the AC coupling capacitors can be avoided. For example, when the chip design provided by this application is employed by the GPU and the bridge chip communicating with each other on the PCB board of a Gemini graphics card, the Gemini graphics card can achieve the same performance with lower cost and smaller PCB size because it does not require any AC coupling capacitors; what is more, the Gemini graphics card can even achieve better performance with lower cost and smaller PCB size because the incompleteness of the signals caused by the AC coupling capacitors can be eliminated.

In the other aspect, V_bias can be selected through the multi-route selector so that the products equipped with the AC coupling capacitors can be compatible. Of course, it should be appreciated to those skilled in the art that 0V DC bias voltage can also be selected through the multi-route selector for the products equipped with the AC coupling capacitors, although the function of blocking DC and delivering AC of the AC coupling capacitors cannot be utilized in the time. This fully reflects that the technical solution provided by this application can be flexibly compatible with the conventional products.

Figure 4A:
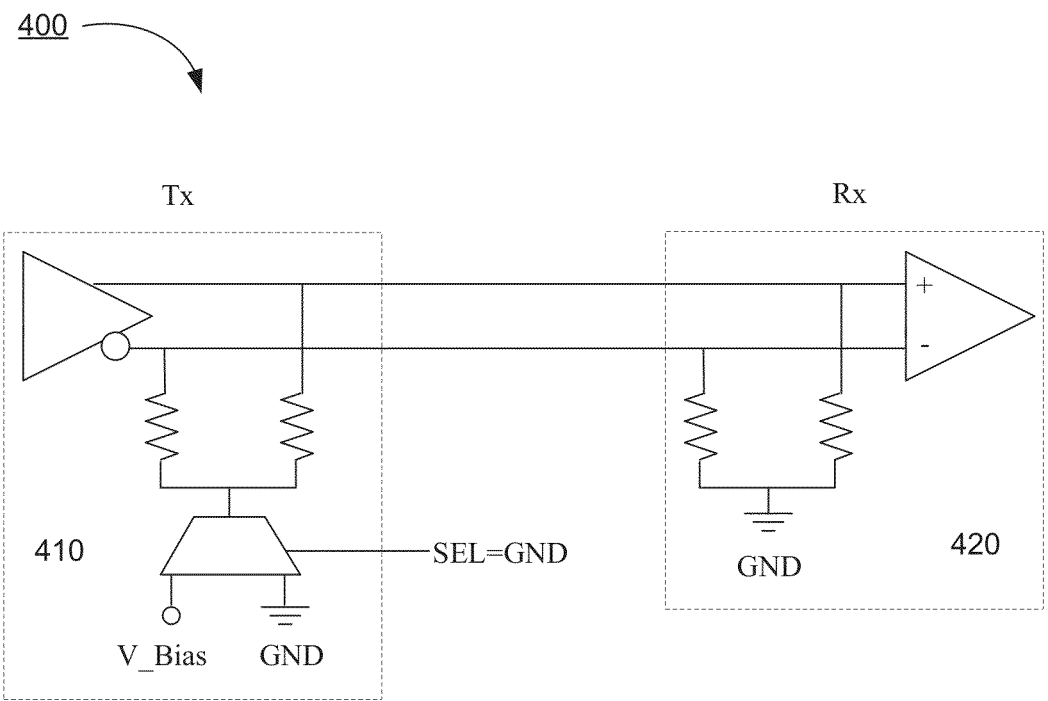
FIGS. 4A, 4B and 4C illustrates the circuit diagrams of the communication systems between multiple chips, in accordance with exemplary embodiments of the present invention respectively.
Figure 4B:
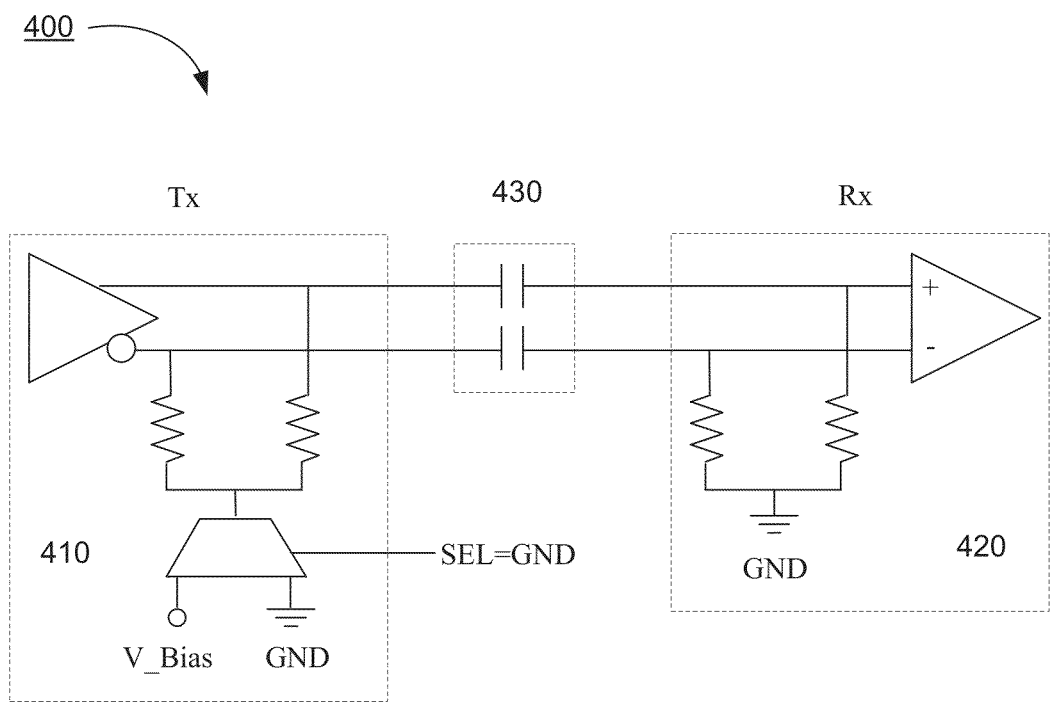
Figure 4C:
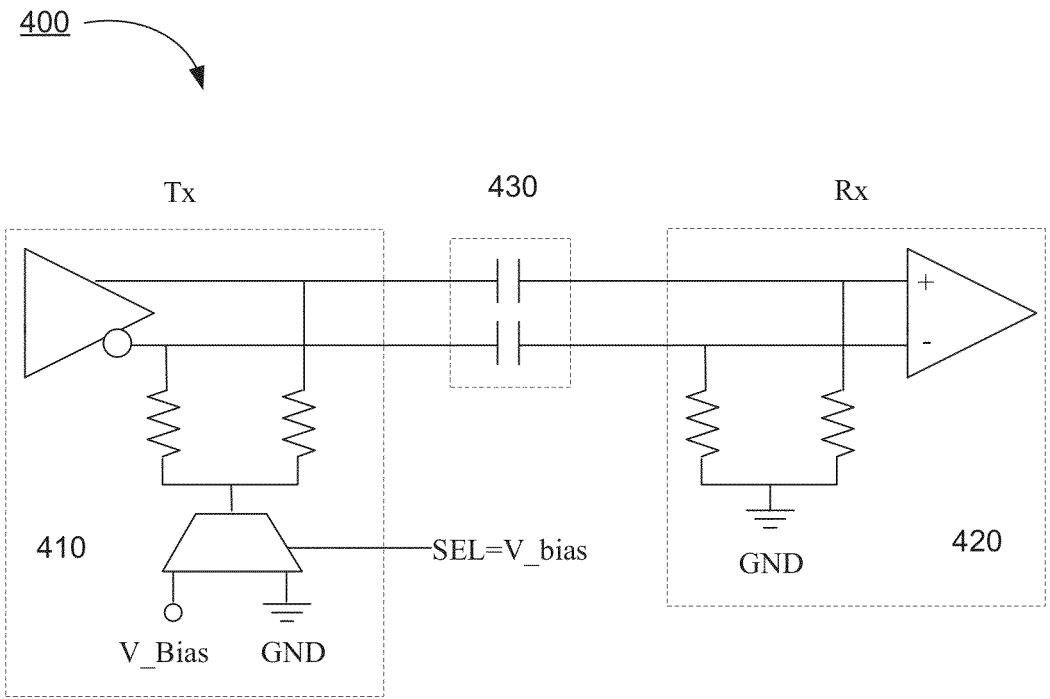

This application also discloses a communication system between multiple chips and FIGS. 4A, 4B and 4C illustrate three embodiments of the communication system between multiple chips 400 respectively.

In the above three embodiments, the communication systems between multiple chips 400 comprise:

A first chip 410 comprising a signal transmitting circuit, which is a chip comprising a signal transmitting circuit provided by this application and its signal transmitting circuit is the signal transmitting circuit shown in FIG. 2; similarly, the first selection signal can be zero level and the second selection signal can be non-zero level, or verse vice; or, the first selection signal and the second selection signal can be set as other values.

A second chip 420, which has a signal receiving circuit.

In these embodiments, both the first chip 410 and the second chip 420 can be selected from GPUs, bridge chips, chipsets with a PCIE interface or the like.

In these embodiments, the first chip 410 communicates with the second chip 420 and the signal receiving circuit in the second chip 420 receives a pair of differential signals transmitted by the first chip 410.

Although only the example in which the first chip 410 transmits signals and the second chip 420 receives the signal is provided in the above three embodiments, it should be appreciated to those skilled in the art that the first chip 410 can transmit signals to other chips besides the second chip 420, and the second chip 420 can receive signals from other chips besides the first chip 410.

It should also appreciated to those skilled in the art that both a signal transmitting circuit and a signal receiving circuit should be included within a chip on a PCB board for implementing the communication. That is, a signal receiving circuit (not shown in FIGS. 4A, 4B and 4C) can also be set in the first chip 410 for receiving signals from the second chip 420 or other chips; while a signal transmitting circuit (not shown in FIGS. 4A, 4B and 4C) can also be set in the second chip 420 for transmitting signals to the first chip 410 or other chips.

The communication system between multiple chips 400 provided by this application presents different architectures since the DC bias voltage of the first chip 410 can be selected between 0V and V_bias.

In one architecture of the communication system between multiple chips 400, the first chip 410 and the second chip 420 are set on the same platform, and the multi-route selector in the first chip 410 selects its first input end which means that the DC bias voltage of the first chip 410 is 0V. The same platform may be different PCB boards sharing the same power supply and the same ground (called as one system), preferably the same PCB board.

In a detailed embodiment based on the above architecture, the operating DC common mode voltages of the signals of the first chip 410 and the second chip 420 are 0V because the DC bias voltages of the first chip 410 and the second chip 420 are 0V, so that it is allowed that no AC coupling capacitors are set between the first chip 410 and the second chip 420, as shown in FIG. 4A, to save the area of the PCB board, reduce the cost and improve the signal integrity.

In another detailed embodiment based on the above architecture, AC coupling capacitors 430 can be set between the first chip 410 and the second chip 420, as shown in FIG. 4B. However, since 0V DC bias voltage of the first chip 410 makes the operating DC common mode voltages of the signals of the first chip 410 to be 0V, so that in fact the function of blocking DC and delivering AC of the AC coupling capacitors 430 cannot be utilized. Nevertheless, it can be found that the chip provided by this application can be compatible with the system equipped with the AC coupling capacitors in case that the first input end is selected.

In another architecture of the communication system between multiple chips 400, AC coupling capacitors 430 are set between the first chip 410 and the second chip 420, and the multi-route selector in the first chip 410 selects the second input end which means that the operating DC common mode voltages of the signals of the first chip 410 is V_bias because the DC bias voltages of the first chip 410 is V_bias, as shown in FIG. 4C. This architecture of the communication system between multiple chips 400 mainly aims at the situation where the first chip 410 and the second chip 420 are set on different platforms (such as two PCB board with different power supplies or grounds) and the AC coupling capacitors 430 block DC and delivery AC, which shows that the chip provided by this application can be compatible with the system equipped with the AC coupling capacitors when the second input end is selected. It is appreciated to those skilled in the art that this architecture can also be applied in the situation where the first chip 410 and the second chip 420 are set on the same platform.

This application also provides a method for configuring the communication system between multiple chips and one embodiment comprises the following steps:

when a first condition is satisfied, the selection signal in the first chip is set as a first selection signal;

upon the first selection signal, the multi-route selector in the first chip selects the first input end, i.e. the DC bias voltage of the first chip is 0V, so that the operating DC common mode voltages of the signals of the first chip are same as those of the signals of the second chip (0V);

wherein the first condition is that the first chip and the second chip are set on the same platform and preferably, the same platform includes the same PCB board.

In a detailed embodiment, the first condition can be limited more specifically. For example, the first condition can be limited to that the first chip and the second chip are set on the same platform and no AC coupling capacitors are set between the first chip and the second chip. Thus, the first input end being selected upon the first condition means that the DC bias voltages of the first chip and the second chip are kept grounded and there is no AC coupling capacitors between the first chip and the second chip for blocking DC and delivering AC, so as to save the area of the PCB board, reduce the cost and improve the signal integrity.

In another detailed embodiment, the first condition can be limited to that the first chip and the second chip are set on the same platform and AC coupling capacitors are set between the first chip and the second chip. Thus, the first input end being selected upon the first condition means that the DC bias voltages of the first chip and the second chip are kept grounded and there are AC coupling capacitors between the first chip and the second chip for blocking DC and delivering AC, so that the chip provided by this application can be compatible with the system equipped with AC coupling capacitors when the first input end is selected.

The method for configuring the communication system between multiple chips provided by this application may also comprises the following steps:

when the second condition is satisfied, the selection signal in the first chip is set as a second selection signal;

upon the second selection signal, the multi-route selector in the first chip selects the second input end, i.e. the DC bias voltage of the first chip is V_bias, so that the operating DC common mode voltages of the signals of the first chip are V_bias;

wherein the second condition is that there are AC coupling capacitors set between the first chip and the second chip.

Therefore, the second input end being selected upon the second condition means that the DC bias voltages of the first chip and the second chip are different and there are AC coupling capacitors between the first chip and the second chip for blocking DC and delivering AC, so that the chip provided by this application can be compatible with the system equipped with AC coupling capacitors when the second input end is selected.

It should be appreciated to those skilled in the art that the second condition can also be limited to that the first chip and the second chip are set on the same platform or on the different platforms. Note that the operation corresponding to the first condition will be preferentially executed under the circumstances of concurrence of the first condition and the second condition. That is, when the first condition that the first chip and the second chip are set on the same platform and there are AC coupling capacitors set between the first chip and the second chip is satisfied, the second condition that there are AC coupling capacitors set between the first chip and the second chip is also satisfied. Then, the operation of selecting the first input end is executed.

In the above embodiments, the first selection signal can be zero level and the second selection signal can be non-zero level, or vice versa; or, the first selection signal and the second selection signal can be set as other values.

Having thus described a preferred embodiment, it should be apparent to those skilled in the art that certain advantages of the described method and apparatus can be achieved. It should also be appreciated that various modifications, adaptations and alternative embodiments thereof may be made within the scope and spirit of the present invention. The invention is further defined by the following claims.

What is claimed is:

1. A chip comprising a signal transmitting circuit, said signal transmitting circuit further comprising:
   a multi-route selector, comprising a first input end, a second input end, a selection input end and an output end; wherein said first input end of said multi-route selector is grounded, said second input end is connected to a DC bias voltage and said selection input end receives a selection signal;
   a first bias resistor and a second bias resistor, one end of each of said first bias resistor and second bias resistor being connected to said output end of said multi-route selector respectively;
   a first signal line and a second signal line, coupling to the other end of said first bias resistor and the other end of said second bias resistor respectively;
   a signal transmitting end, transmitting a pair of differential signals through said first signal line and said second signal line;
   wherein said multi-route selector selects said first input end when said selection signal is a first selection signal, and said multi-route selector selects said second input end when said selection signal is a second selection signal.

2. The chip of claim 1, wherein said first selection signal is zero level and said second selection signal is non-zero level; or, said first selection signal is non-zero level and said second selection signal is zero level.

3. The chip of claim 1, wherein said signal transmitting circuit further comprises a selection signal generator for generating said selection signals.

4. The chip of claim 3, wherein said selection signal generator is implemented as a register.

5. The chip of claim 3, wherein said selection signal generator is implemented as a program fixed in BIOS of a chip where said signal transmitting circuit occurs.

6. The chip of claim 3, wherein said selection signal generator is implemented as a hardware circuit, including:
   a first selection resistor and a second selection resistor connected between a VCC terminal and a ground terminal in series;
   a selection signal output end, coupling between said first selection resistor and said second selection resistor; wherein said selection signal output end, said first selection resistor and said VCC terminal constitute a first path, and said selection signal output end, said second selection resistor and said ground terminal constitute a second path;
   wherein only one of said first path and said second path is set in on-state at the same time.

7. The chip of claim 1, wherein said chip is one of a GPU chip, a bridge chip and a chipset with a PCIS interface.

8. A communication system between multiple chips, comprising:
   a first chip comprising a signal transmitting circuit, said signal transmitting circuit further comprising:
      a multi-route selector, comprising a first input end, a second input end, a selection input end and an output end; wherein said first input end of said multi-route selector is grounded, said second input end is connected to a DC bias voltage and said selection input end receives a selection signal;
      a first bias resistor and a second bias resistor, one end of each of said first bias resistor and second bias resistor being connected to said output end of said multi-route selector respectively;
      a first signal line and a second signal line, coupling to the other end of said first bias resistor and the other end of said second bias resistor respectively;
      a signal transmitting end, transmitting a pair of differential signals through said first signal line and said second signal line;
      wherein said multi-route selector selects said first input end when said selection signal is a first selection signal, and said multi-route selector selects said second input end when said selection signal is a second selection signal;
   a second chip, within said second chip a signal receiving circuit is set;
   wherein said first chip communicates with said second chip and said signal receiving circuit in said second chip receives said pair of differential signals transmitted by said first chip.

9. The communication system between multiple chips of claim 8, wherein said first chip and said second chip are set on the same platform, and said multi-route selector in said first chip selects said first input end.

10. The communication system between multiple chips of claim 9, wherein said same platform includes the same PCB board.

11. The communication system between multiple chips of claim 9, wherein there are no AC coupling capacitors set between said first chip and said second chip; or, there are AC coupling capacitors set between said first chip and said second chip.

12. The communication system between multiple chips of claim 8, wherein there are AC coupling capacitors set between said first chip and said second chip, and said multi-route selector in said first chip selects said second input end.

13. The communication system between multiple chips of claim 8, wherein said first selection signal is zero level and said second selection signal is non-zero level; or, said first selection signal is non-zero level and said second selection signal is zero level.

14. The communication system between multiple chips of claim 8, wherein said first chip and said second chip are one of GPU chips, bridge chips and chipsets with a PCIE interface.

15. A method for configuring a communication system between multiple chips, said communication system between multiple chips comprising:
- a first chip comprising a signal transmitting circuit, said signal transmitting circuit comprising:
  - a multi-route selector, comprising a first input end, a second input end, a selection input end and an output end; wherein said first input end of said multi-route selector is grounded, said second input end is connected to a DC bias voltage and said selection input end receives a selection signal;
  - a first bias resistor and a second bias resistor, one end of each of said first bias resistor and second bias resistor being connected to said output end of said multi-route selector respectively;
  - a first signal line and a second signal line, coupling to the other end of said first bias resistor and the other end of said second bias resistor respectively;
  - a signal transmitting end, transmitting a pair of differential signals through said first signal line and said second signal line;
- a second chip, within which a signal receiving circuit is set;
- wherein said first chip communicates with said second chip and said signal receiving circuit in said second chip receives said pair of differential signals transmitted by said first chip;

wherein said method comprising:
- when a first condition is satisfied, setting said selection signal in said first chip as a first selection signal;
- said multi-route selector in said first chip selecting said first input end upon said first selection signal;
- wherein said first condition is that said first chip and said second chip are set on the same platform.

16. The method of claim 15, wherein said same platform includes the same PCB board.

17. The method of claim 15, wherein said first condition also includes that there are no AC coupling capacitors set between said first chip and said second chip; or, said first condition also includes that there are AC coupling capacitors set between said first chip and said second chip.

18. The method of claim 15, wherein said method further comprises:
- when a second condition is satisfied, setting said selection signal in said first chip as a second selection signal;
- said multi-route selector in said first chip selecting said second input end upon said second selection signal;
- wherein said second condition is that there are AC coupling capacitors set between said first chip and said second chip.

19. The method of claim 18, wherein said first condition has a higher priority than said second condition.

20. The method of claim 15, wherein aid first selection signal is zero level and said second selection signal is non-zero level; or, said first selection signal is non-zero level and said second selection signal is zero level.

* * * * *